June 4, 1968     J. L. HOLMES ET AL     3,386,283
TENSILE TESTER WEDGE CLAMP
Filed Oct. 8, 1965     2 Sheets-Sheet 1

INVENTOR.
John L. Holmes
George W. Torrey
Nicholas D. Spino
Walter S. Vargas
ATTORNEY WITNESS:
Esther M. Stockton

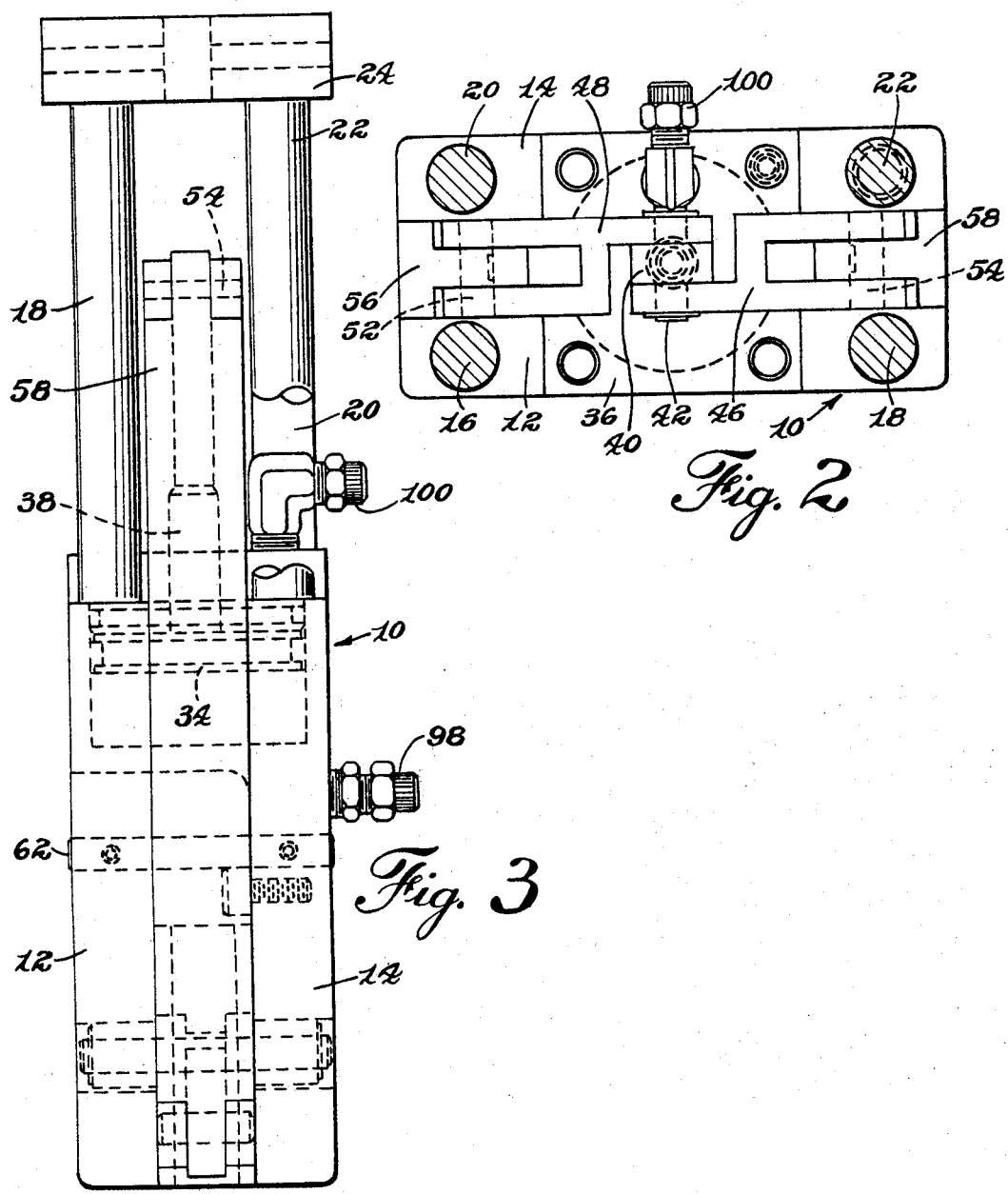

3,386,283
TENSILE TESTER WEDGE CLAMP
John L. Holmes, Providence, George W. Torrey, Barrington, Nicholas D. Spino, Providence, and Walter S. Vargas, North Kingstown, R.I., assignors to The Bendix Corporation, a corporation of Delaware
Filed Oct. 8, 1965, Ser. No. 494,219
1 Claim. (Cl. 73—103)

ABSTRACT OF THE DISCLOSURE

A pneumatically-actuated wedge clamp for a tensile tester in which the initial clamping is produced by pneumatic pressure on piston operating adjustable toggle arms to engage the clamping anvils. Further clamping pressure is obtained by allowing a precise, limited rotary wedging movement of the clamping anvils on their toggle arms. The anvils are limited in their wedging action by abutment with the frame of the clamp so that the tensile force is transferred from the toggle arms to the frame. Pneumatic actuated release of the clamping forces insures against test equipment "freezing" or "locking-up" and terminates the test cycle.

---

The present invention relates to a tensile tester wedge clamp particularly adapted for accurately gripping wire specimens or the like in a tensile testing machine whose objective is to produce accurate stress and deformation data.

It is an object of the present invention to provide a wedge clamp for a tensile tester which obtains accurate and known location of a wire specimen to produce more accurate deformation data than that heretofore obtained.

It is another object of the present invention to provide a wire clamp operating on a wedge principle which avoids buckling of the wire specimen, thus avoiding deformation data error from this source.

It is a still further object of the present invention to provide a wedge action clamp which follows the change in dimension of wire specimen under tensile load without altering specimen reference length.

It is a still further object of the present invention to provide a pneumatically-actuated wedge clamp providing uniform centered loading to wire specimens.

Another object of the present invention is to provide a wedge wire clamp having known travel during wedge operation regardless of size or hardness of specimen, thus eliminating a variable factor from deformation data.

Other objects and advantages of the present invention will become apparent from the accompanying description and drawings wherein:

FIGURE 2 is a view of the clamp taken along section line 2—2 of FIGURE 1; and

FIGURE 3 is a side view of the clamp of FIGURE 1.

Figure 1:
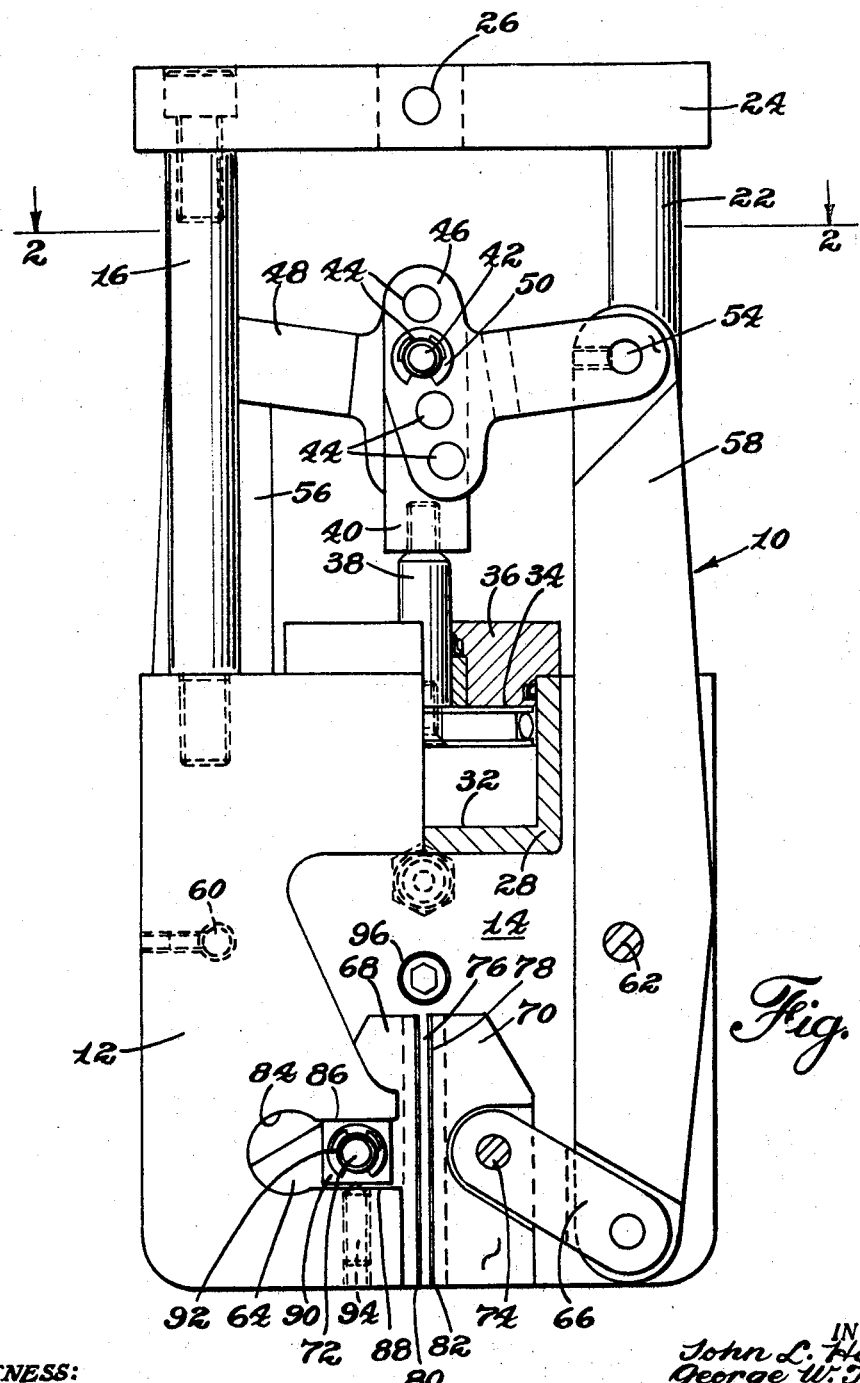
FIGURE 1 is a front view of a preferred embodiment of a wire clamp, partly in section.

Referring to the drawings, there is illustrated a preferred form of the wire clamp mechanism of the present invention generally designated by numeral 10. The clamp consists of a load transfer housing structure formed by a pair of connected parallel load absorbing plates 12 and 14 each having a pair of rigid rods 16, 18 and 20, 22, respectively, secured to the upper surface and connected to a spaced yoke plate 24 having a hole connection 26 which is adapted for connection to a tensile testing machine having preferably load and deformation measuring and recording equipment.

Plates 12 and 14 are connected into a single integral member near the top center by connecting web 28 in which there is formed a cylindrical piston bore 32 (FIGURE 1) which contains a piston 34 and is enclosed by cover 36 having a central opening through which piston rod 38 extends. Piston rod 38, in turn, is connected to flat bar 40 which holds pin 42 which passes through one of a plurality of holes 44 formed in first toggle link 46. A second toggle link 48, similar to link 46, is also connected by pin 42 which is secured by spring clips 50. The configuration of our clamp mechanism is symmetrical to the right and left of the centerline of FIGURE 1. Toggle links 46 and 48 are pivotably connected by pins 52 and 54 to levers 56 and 58 respectively. Pivot shafts 60 and 62 have ends secured to the plates 12 and 14 and form pivot fulcrums for the levers 56 and 58 respectively. Links 64 and 66 are pivotably pinned to the lower ends of levers 56 and 58, respectively, and each is obliquely inclined, extending upwardly and inwardly towards the clamp center line so that the end of each link furthest from its pinned connection with levers 56, 58 is vertically above this pinned connection.

Clamping anvils 68, 70 are connected respectively to the inner ends of links 64, 66 by pin shafts 72, 74. The anvils 68, 70 having confronting clamping faces 76, 78 having inserted therein tooth or file clamping inserts 80, 82 on which the tooth bite is preferably directed upwardly to provide maximum grip under tensile load on a wire inserted between the faces.

The parallel plates 12, 14 each have a pair of horizontally-extending slots, one of which is designated by numeral 84 adjacent the clamping anvils, each slot having a pair of spaced horizontally-extending surfaces 86 and 88. Mounted slidably within slot 84 is a bearing block 90 pinned to pin shaft 72 and retained by spring clips such as spring clip 92. It will be understood that the clamp contains four bearing blocks in all, one on both sides of anvils 68 and 70. Immediately below and abutting the bearing block is a spring-loaded plunger 94 biasing the bearing block against the upper horizontal surface 86. Our clamp mechanism is completed by abutment screw 96 and pneumatic fittings 98 and 100 connecting pressurized air to piston 34.

In the clamp released position, piston 34 is positioned downwardly from the position illustrated in FIGURE 1, and anvils 68 and 70 have their maximum spaced apart distance from the clamp center line. Spring biased plungers load the bearing blocks against the upper bearing surface 86, leaving a slight clearance, termed wedging clearance, between the lower face of bearing blocks and lower bearing surface 88. A wire specimen is inserted between confronting anvil faces. Abutment screw 96 prevents too far an insertion which would avoid the gripping teeth of inserts 80, 82. Pneumatic pressure is then applied to piston 34, moving it upwardly towards the position illustrated in FIGURE 1. Toggle links 46, 48 are rocked towards, but short of, their over center position, forcing the upper ends of levers 56, 58 outwardly and the lower ends inwardly. Anvils 68, 70 will move horizontally inwardly, guided by bearing blocks against upper bearing surface, clamping the wire specimen. Movement of the anvils horizontally or perpendicular to wire specimen avoids buckling the specimen during the clamping action. Now, as the tensile testing machine is actuated to pull on yoke 24, the wire specimen will pull downwardly through the anvil gripping teeth on the anvils. As the load plates 12, 14 are pulled upwardly relative to anvils 68, 70, the anvils will move inwardly to tightly wedge the wire specimen due to the inclination of links 64, 66 to perform the wedging operation. Even though wedging has occurred, it will be observed that there is no tendency to buckle the wire specimen as the anvils have not moved vertically in an absolute sense and the relative movement between anvils and load plates has been obtained by upward movement of the load plates during the first phase of movement from the tensile machine.

Wedging occurs until bearing blocks abut the lower bearing surface such as surface 88 at which time the load from tensile machine is transferred through load plates, bearing blocks, anvils to the wire specimen.

In prior art clamp mechanisms operating on a wedge principle, the wedging operation produced a deformation error since the amount of wedging action was variable with changes in wire cross section, hardness, etc. The present device produces a uniform wedge travel equal to the wedge clearance between bearing block and lower bearing surface. Consequently, this former variable becomes a known amount which may easily be accounted for to obtain accurate deformation data.

Further, with pneumatic actuation, a uniform clamping load may be applied, regardless of wire cross section variations and the anvils are self centering along the clamp center line. Not only does the use of a compressible actuating medium such as air permit the piston position to conform to specimen cross section, but regardless of variations in position, the optimum or maximum toggle action of links 46 and 48 may be maintained by selection of the appropriate one of the plurality of holes 44 for connection with piston rod 40. This adjustable toggle feature assist in obtaining uniform deformation data while permitting capability of accepting specimen size variations.

While the invention has been disclosed in a single preferred embodiment, it will be understood by those skilled in the art that structural variations may be made or refinements eliminated without departing from the scope and spirit of the invention as defined in the claims.

We claim:
1. A clamp mechanism for use in a wire tensile tester or the like comprising:
   a load transfer housing having attachment means to attach said housing to said tester or the like and a plurality of slotted guides generally disposed in opposition to said attachment means;
   said slotted guides having on the side toward said attachment means one bearing surface each, and on the opposite side, one anvil support surface each, said surfaces being generally parallel;
   a pair of movable anvils within said housing, said anvils having confronting surfaces adapted to grip a wire specimen along a clamping axis and further adapted to inhibit movement of said specimen along said axis, said axis being perpendicular to said bearing and anvil support surfaces;
   bearing means attached to said anvils and loosely retained within said slotted guides operative to guide said anvils normal to said clamping axis;
   resilient bearing guides operative to yieldably bias said bearing means away from said anvil support surfaces and toward said bearing surfaces;
   said bearing means movable within said slotted guides parallel to said clamping axis a predetermined wedging clearance distance when sufficient force is exerted to overcome said resilient bearing guides;
   said anvil support surface operative to receive test tension loads during testing in response to relative motion between said anvils and said housing, along said clamping axis, through said predetermined wedging clearance distance;
   a pneumatic cylinder having first and second pneumatic fittings located within said housing;
   a double-acting pneumatic piston having a piston rod within said cylinder;
   said piston operative to move to a first position in response to the introduction of pneumatic fluid into said first pneumatic fitting and further operative to move to a second position in response to introduction of pneumatic fluid into said second pneumatic fitting, said first and second positions being generally at opposite ends of said pneumatic cylinder; and
   a plurality of toggle link means having first, second and third members each interconnecting said piston rod and said anvils wherein said first toggle link members are pivotally attached to said piston rod and one end of each of said second toggle link members, and are adjustable such that when said piston moves to said first position, the attachment points between said first toggle link members have approached, but have not crossed, the line drawn between the attachment points of said first toggle link members to said second toggle link members, each of said second toggle link members are pivotally attached to said housing and connected on their other ends to one end of each of said third toggle link members which are connected to said anvils such that the attachment points between said anvils and said third toggle link members remain on one side of the line drawn between the attachment points of said second toggle link members to said third toggle link members, whereby when tension is applied to the specimen and said anvils execute movement through said wedging clearance distance, the levers tend to increase the gripping force applied to the specimen by bringing the attachment points of said anvils to said third toggle links closer to the line drawn between the attachment points of said second toggle link members to said third toggle link members.

References Cited
UNITED STATES PATENTS

| | | | |
|---|---|---|---|
| 528,738 | 11/1874 | Pfouts | 269—34 |
| 1,370,251 | 3/1921 | Wilhelm | 269—34 |
| 2,600,923 | 6/1952 | Rogers et al. | 73—103 |
| 3,170,322 | 2/1965 | Cavanaugh | 73—103 |
| 3,204,451 | 9/1965 | Cavanaugh et al. | 73—103 |
| 3,224,259 | 12/1965 | De Wicola | 73—103 |

RICHARD C. QUEISSER, *Primary Examiner.*

JAMES J. GILL, *Examiner.*

JAMES H. WILLIAMSON, *Assistant Examiner.*